US008856728B2

(12) United States Patent
Swaminathan et al.

(10) Patent No.: US 8,856,728 B2
(45) Date of Patent: Oct. 7, 2014

(54) COMPOSITION STUDIO TO DEVELOP AND MAINTAIN SURVEILLANCE AND COMPLIANCE SCENARIOS

(75) Inventors: Satish Swaminathan, Bangalore (IN); Sameer Kolhatkar, Pune (IN); Shital Mahajan, Pune (IN); Rachit Gupta, Pune (IN); Milind Garge, Pune (IN)

(73) Assignee: Infosys Limited, Bangalore (IN)

( * ) Notice: Subject to any disclaimer, the term of this patent is extended or adjusted under 35 U.S.C. 154(b) by 43 days.

(21) Appl. No.: 13/491,325

(22) Filed: Jun. 7, 2012

(65) Prior Publication Data

US 2013/0254740 A1     Sep. 26, 2013

(30) Foreign Application Priority Data

Mar. 20, 2012   (IN) .......................... 1010/CHE/2012

(51) Int. Cl.
*G06F 9/44* (2006.01)
(52) U.S. Cl.
USPC .......................... 717/105; 717/116; 717/117
(58) Field of Classification Search
None
See application file for complete search history.

(56) References Cited

U.S. PATENT DOCUMENTS

| | | | |
|---|---|---|---|
| 6,546,558 B1 | 4/2003 | Taguchi | |
| 7,043,669 B2 | 5/2006 | Brown | |
| 7,657,474 B1 | 2/2010 | Dybala et al. | |
| 7,693,810 B2 | 4/2010 | Donoho et al. | |
| 2003/0191987 A1 | 10/2003 | Brown | |
| 2004/0015857 A1* | 1/2004 | Cornelius et al. | 717/120 |
| 2004/0177053 A1 | 9/2004 | Donoho et al. | |
| 2007/0168990 A1 | 7/2007 | Alshab et al. | |
| 2009/0222369 A1 | 9/2009 | Zoldi et al. | |
| 2009/0288068 A1* | 11/2009 | Gunsel et al. | 717/116 |
| 2010/0228683 A1* | 9/2010 | Ansley et al. | 705/348 |
| 2010/0284567 A1* | 11/2010 | Hampapur et al. | 382/103 |
| 2010/0287530 A1* | 11/2010 | Maclean et al. | 717/105 |
| 2011/0087559 A1* | 4/2011 | Paul et al. | 705/26.81 |

FOREIGN PATENT DOCUMENTS

| | | |
|---|---|---|
| JP | 09-138790 | 5/1997 |
| WO | WO 2007/035452 | 3/2007 |

OTHER PUBLICATIONS

Chou, "Using Events in Highly Distributed Architectures," *The Architecture Journal* http://msdn.microsoft.com/en-us/library/dd129913.aspx accessed Jun. 28, 2012.

* cited by examiner

*Primary Examiner* — Don Wong
*Assistant Examiner* — Roberto E Luna
(74) *Attorney, Agent, or Firm* — Klarquist Sparkman, LLP

(57) ABSTRACT

A system for generating a plurality of surveillance and compliance scenarios includes a first user interface comprising a graphical modeling tool for writing fraud detection logic in a first language and a second user interface for creating one or more configurable threshold parameters, one or more general parameters, as well as one or more configurable subsets of filters to be applied to the detection logic. The system is configured to interpret the fraud detection logic in the first language and translate the fraud detection logic into a second language that is capable of performing the fraud detection on a subset of transactions data after application of the one or more configurable subsets of filters to the detection logic, as well as limiting a number of alerts that can be generated after application of the threshold and general parameters.

13 Claims, 6 Drawing Sheets

COMPOSITION STUDIO TO DEVELOP AND MAINTAIN SURVEILLANCE AND COMPLIANCE SCENARIOS

BACKGROUND

Many types of businesses and institutions, such as financial institutions, have procedures in place to monitor, investigate, and/or report transactions of suspicious nature. Generally, these procedures are implemented using surveillance and compliance systems built and maintained by dedicated developer teams. During the development stage, knowledgeable business users that generally have the most knowledge regarding the subject matter at issue often have limited ability to provide significant input to the process. Moreover, whenever changes must be made to these systems, whether driven by new regulation, the discovery of shortcomings in existing systems, or for other reasons, these systems must be painstakingly updated by the developers to modify or update existing surveillance and compliance scenarios and/or build new detection logic for additional scenarios. Accordingly, developing and/or maintaining a conventional surveillance and compliance system can be very time consuming, resulting in delayed deployment of such systems and modifications thereto.

Consequently, improvements that provide increased efficiency in developing and maintaining surveillance and compliance systems are desirable, including systems that reduce the dependency on developer teams by reducing the amount of effort required by developer teams in connection with code development and/or code changes.

SUMMARY

A variety of systems and methods are described herein for providing greater flexibility and efficiency in implementing and/or maintaining surveillance and compliance systems by providing a collaborative development environment.

For example, a method, implemented at least in part by one or more computing devices, for generating surveillance and compliance scenarios includes receiving a plurality of surveillance and compliance scenarios created by a first user in a first language using a graphical modeling tool and translating the plurality of surveillance and compliance scenarios into a second language that is configured to perform the surveillance and compliance scenarios on the one or more computing devices to detect the occurrence of a potentially fraudulent event. The graphical modeling tool can be configured to create one or more flowcharts of detection logic and the receiving of the plurality of surveillance and compliance scenarios can include receiving one or more flowcharts of detection logic or representations thereof. The first language can be a business language and the second language can be code for performing the surveillance and compliance scenarios on the one or more computing devices. The second language can include Java code.

In some examples, the method can also include validating the accuracy of the plurality of surveillance and compliance scenarios. The method can include receiving a plurality of input parameters created by a second user relating to the plurality of surveillance and compliance scenarios. The method can include receiving a plurality of filters that are configured to select a subset of transactions data on which the plurality of surveillance and compliance scenarios will be performed. The method can include receiving a plurality of threshold parameters that limit a number of alerts that can be generated by the plurality of surveillance and compliance scenarios when performed on the subset of transactions data. The receiving of the plurality of input parameters can also include receiving a scoring configuration that provides a plurality of rules and weightages to be applied to detected events to generate a risk score for the potentially fraudulent event.

In another example, a system for generating a plurality of surveillance and compliance scenarios is provided. The system can include a first user interface comprising a graphical modeling tool for writing fraud detection logic in a first language and a second user interface for creating one or more configurable subsets of filters to be applied to the detection logic. A class file producer can be provided. The class file producer can be configured to interpret the fraud detection logic in the first language and translate the fraud detection logic into a second language that can be executed on one or more computing devices for performing the fraud detection on a subset of transactions data after application of the one or more configurable subsets of filters to the detection logic. The first language can include business language and the second language can include Java code.

In some examples, the first language can include a business language and the first user interface comprises an algorithm editor that is configured to generate one or more flowcharts in the business language, the flowcharts being representative of the fraud detection logic. The first user interface can include a plurality of views to facilitate creation of the fraud detection logic. The plurality of views can include a business data view configured to reflect an underlying transaction data model in the business language. The plurality of views can also include a function view configured to display commonly-used functions for modifying fraud detection logic in the business language.

In another example, a computer-readable medium storing computer-executable instructions for causing a computing device to perform a method of generating surveillance and compliance scenarios can be provided. The method can include receiving a plurality of surveillance and compliance scenarios created by a first user in a first language using a graphical modeling tool, and translating the plurality of surveillance and compliance scenarios into a second language that is configured to perform the surveillance and compliance scenarios on the one or more computing devices to detect the occurrence of a potentially fraudulent event. The method can also include receiving a plurality of input parameters created by a second user relating to the plurality of surveillance and compliance scenarios. The receiving of the plurality of input parameters can include receiving a plurality of filters that are configured to select a subset of transactions data on which the plurality of surveillance and compliance scenarios will be performed. The graphical modeling tool can be configured to create one or more flowcharts of detection logic and the receiving of the plurality of surveillance and compliance scenarios comprises receiving the one or more flowcharts of detection logic or representations thereof. In some examples, the first language can include a business language and the second language can include code for performing the surveillance and compliance scenarios. The method can also include validating the accuracy of the plurality of surveillance and compliance scenarios.

The foregoing and other objects, features, and advantages of the invention will become more apparent from the following detailed description, which proceeds with reference to the accompanying figures.

DETAILED DESCRIPTION

Figure 1:
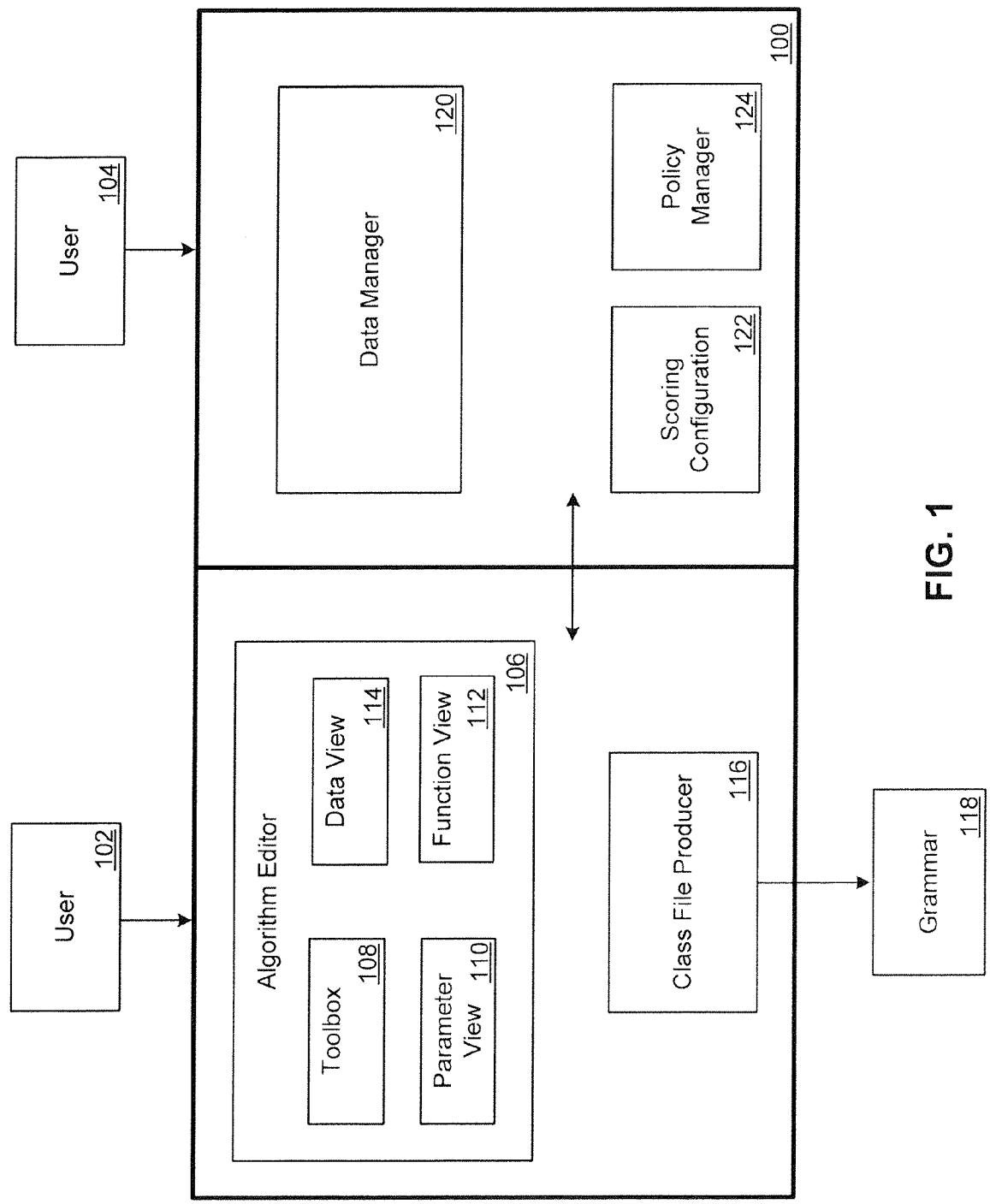
FIG. 1 illustrates exemplary surveillance and compliance scenarios of a composition system.

The present disclosure relates to systems and methods for developing, implementing, and maintaining surveillance scenarios in various fields. For example, the methods and systems described herein can be used to implement and maintain surveillance scenarios relating to regulated (either externally or internally) domains, such as scenarios relating to brokerage compliance, asset and wealth management compliance, anti-money laundering, "know your customer" (KYC) requirements, employee monitoring, payments, exchanges/ self-regulatory organization compliance, exchange or market surveillance by regulatory bodies, and other financial and non-financial monitoring and tracking requirements. In some embodiments described herein, the systems and methods facilitate iterative development of detection scenarios that can improve efficiencies by reducing overall scenario development cycle time.

The following examples generally involve monitoring of financial transactions to detect transactions of a suspicious nature, such as fraudulent transactions. Since financial institutions are generally required to monitor, investigate, and report transactions of suspicious nature, efficient systems and methods of designing surveillance scenarios that can connect one or more compliance domains to meet changing business needs and regulatory requirements are desirable. For example, as part of compliance under anti-money laundering (AML) regulations financial institutions and other regulated entities are required to implement controls to prevent and/or report money laundering activities to the financial intelligence units of the central bank in the respective country. Although the following examples relate generally to financial transactions, it should be understood that the systems and methods described herein are applicable to other environments and other types of transactions.

In order to analyze the transactions data to detect possible cases of fraud, the systems and methods described herein can provide financial institutions with certain controls that can identify such potentially fraudulent events. These controls can include, for example, detection engines that include of a set of business rules coupled with an algorithm to detect the possible frauds or intent of fraud based on transactions data. In addition, to enhance the accuracy of detection of fraudulent events, modifications in the parameters or thresholds in the business rules can be made. Also, one or more customized scoring models can be provided to manage the unique risk profile of any particular portfolio of detection scenarios or identified fraudulent transactions.

Conventional surveillance and compliance systems require significant time and efforts not only to build such systems but also to maintain them. The effectiveness of conventional systems is largely dependent upon the technical capabilities of the developers, who often lack a business understanding in terms of understanding the transactional and/or regulatory nuances along with detailed business requirements to be met in connection with the direct and indirect goals of the system. In addition, conventional systems limit business users, who understand the nature of the goals of the system in terms of participating during development and validation processes. Because of the changing environment in which such systems operate, the development and maintenance of conventional systems can be particularly difficult and time consuming. For example, such surveillance and compliance systems generally require updating when there are relevant changes in regulations and/or new types of fraud or other problematic events are identified. The resulting lengthy cycle times of providing up-to-date surveillance and compliance systems exposes institutions to increased risk of fraud and other such events during these cycle times.

The systems and methods provided herein allow for increased business user interaction in the creation and/or maintenance of surveillance and compliance systems. As discussed in more detail herein, new scenarios can be created and existing scenarios can be maintained and updated more effectively by allowing business users to conduct functional reviews of the scenarios during the logic development process. Thus, the systems and methods described herein can improve efficiency and productivity, while at the same time maintaining a desired level of efficiency and accuracy of the investigations performed by the surveillance and compliance systems.

I. Systems and Methods for Developing and Maintaining Scenarios

In some embodiments described herein, systems and methods are provided for enabling business users and development teams to have a common platform for iteratively developing algorithms that are configured to detect potentially fraudulent transactions. Business users can be provided with an opportunity to perform a functional review of the logic during development stage itself, thereby reducing cycle times in development and maintaining such systems, which in turn results in significant savings in costs, efforts, and/or time.

A surveillance and compliance scenarios composition system 100 is illustrated in FIG. 1. As shown in FIG. 1, one or more first and second users 102, 104, respectively, can enter information into system 100. In one embodiment, first users 102 can comprise business and IT users (e.g. users that are generally techno functional). Second users 104 can comprise system administrators or other such members of a development team. The system can be configured so that first users 102 can utilize an algorithm editor 106 to create one or more scenarios (e.g., detection logic). The scenarios can be created in the form of one or more flowcharts. Algorithm editor 106 can include a toolbox 108 to facilitate the drawing of flowcharts by first users 102. In addition, a user-friendly business language can be provided to simplify the creation of detection logic so that business users with relatively small amounts of training can understand the algorithms being created with algorithm editor 106. Various views are provided to effectively facilitate creation of scenarios using algorithm editor 106. For example, a policy parameter view 110, a function view 112, and a business data view 114 are provided.

Policy parameter view 110 can facilitate the entry of values of policy parameters by first user 102. Function view 112 can be used to display and utilize functions created by the development team. In this manner, function view 112 can allow a first user 102 to generate very complex detection logic. Business data view 114 can provide a logical view of the underlying relational data model in business friendly terminology. This logical layer is an abstraction over the relational database management system (RDBMS) data model. The capability of creating the business data view 114 of the underlying transaction data model and using it in the detection logic can significantly improve the ability of the first user 102 to create detection logic using algorithm editor 106.

A class file producer 116 can be provided to interpret the flowchart created using algorithm editor 106. Class file producer 116 can produce code that runs in the production environment to produce the desired results. In some embodiments, class file producer 116 is configured to produce Java code; however, it should be understood that class file producer 116 can be configured to produce code in other languages, including, but not limited to, for example, C++ or Python.

A grammar input 118 can be provided through which an external text file or an extended markup language file can act as an input to the system. If the business language used in algorithm editor 106 requires further enhancement, the external grammar text/XML file can be modified by a system administrator or other such members of the development team.

Second users 104 can interact with the system to manage business data, policies, data filters and/or scoring attributes. For example, a business data manager 120 can be provided as an abstraction over a physical database. Business data manager 120 can be configured to show data models that are relevant to a user for defining scenario logic. In addition, business data manager 120 can show business friendly attributes including hierarchy relationships between them and entity names to facilitate interaction of a business user with the system 100. Using business data manager 120, tables and columns that are relevant to the business user can be mapped to metadata defined by the business user(s), while the rest can remain generally hidden from the business user based on the role and system access entitlements applicable for that role or specific user. The mapping information can be stored in a database table, such as CS_MetaData, in the form of Name-Value pair. In operation, business user 102 can write the algorithm using algorithm editor 106 on business data and when the algorithm is being translated by class file producer 116, the business data can be mapped to physical database entities.

A policy manager 124 can be provided to enable policy setup and configurations for the scenarios being developed. Policy manager 124 can also allow for the creation and configuration of filters which enable selection of the required subset of transactions data on which the detection logic will run. Users can also configure threshold parameters to limit the number of alerts generated by the detection logic. Policy manager 124 can comprise one or more of filter definitions, threshold parameter definitions, and general parameter definitions.

The filters can be configured to limit the data that is used in the detection logic. Filters can be defined by a user (such as an administrator or developer) and values for these filters can be set by the business user 102 depending on the requirement. Using the filter definitions and the relations between the database tables, views can be created on the tables that are related to the filter data. In addition, the policy manager can be configured to create s policies using one or more of the above definitions.

The fraud detection scenarios can have different set of input parameters based on the detection logic created by algorithm editor 106. Also, the detection logic can be configured to operate on different sets of filtered data based on customer geographies, etc. Policy Manager 124 can enable easy customization and configuration for the policies and data filters to be set up using the system.

When the detection logic is run, one or more of the available views can be used instead of the database tables. In this manner, changing one or more filter definition or filter values, can alter the detection logic to obtain a desired result. A scoring configuration 122 can also be provided for providing customizable rule-based scoring models for risk management at transaction and/or portfolio levels as well to indicate the criticality of an identified fraudulent transaction. Scoring configuration 122 can provide for a flexible rule specific score definition, which in turn defines the scope and service level agreement management of alerts. Rules can be identified and a desirable weightage can be assigned to arrive at a comprehensive risk and/or criticality score.

II. Example Algorithm Editor

In one embodiment, algorithm editor 106 can be based on Eclipse-based Graphical Modeling Framework (GMF), which is an open source framework within the Eclipse platform. The GMF can provide a set of models to define the editor which helps to capture graphical, tooling, and metamodeling definition. The editor can also be equipped with different views created using Eclipse plugins for SWT, jface and Eclipse UI.

The GMF can provide the runtime infrastructure to develop the graphical editors described herein. The GMF can be configured to provide the bridge between Eclipse Modeling Framework (EMF) and Graphical Editing Framework (GEF). GEF is model-view-controller (MVC) based framework configured to create graphical editors. However, in some situations, it can be difficult to use custom models with GEF because a developer has to write custom code to support the custom model. Thus, although EMF has the ability to support custom models it can be difficult to use GEF with EMF. The GMF described herein can integrate the EMF-generated models with GEF-based editors.

Figure 2:
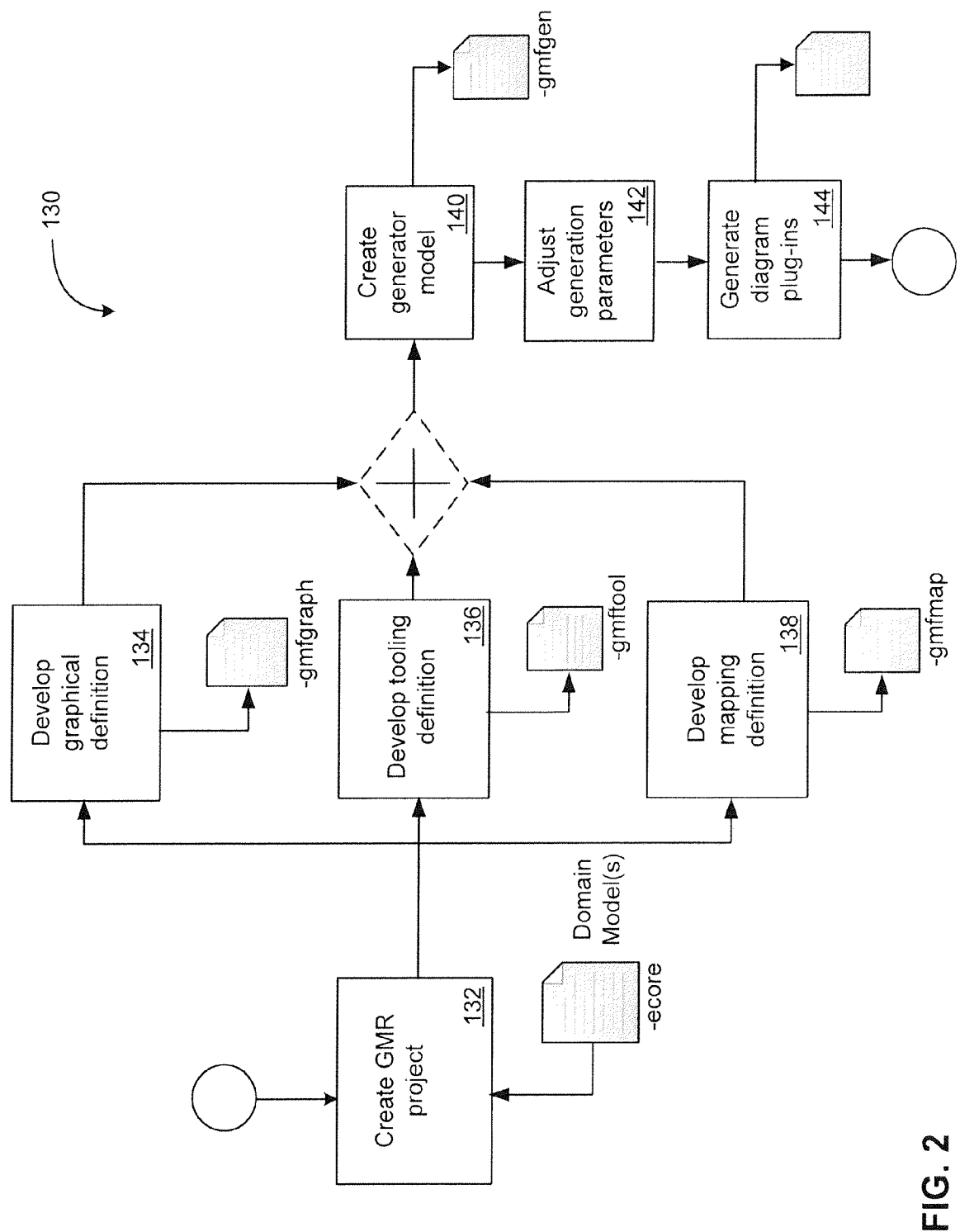
FIG. 2 illustrates a diagram depicting an example method for the development of a GMF-based editor.

FIG. 2 illustrates a diagram depicting an example method for the development of a GMF-based editor such as the open source framework within the Eclipse platform. The GMF framework 130 comprises a set of models to capture the model mapping, graphical, and tooling definitions. At 132, a domain model (.ecore) can be created. At 134, a graphical definition model (.gmfgraph) can be provided which contains the information about the graphical elements with no direct connection to the domain model. At 136, a tooling definition model (.gmftool) can provide the toolbars and menu bars. Because these are independent models, there is a need to link them together. For this, at 138, a mapping model (.gmfmap) can be created. Once the mapping model is defined, at 140, 142, and 144, a generator model of GMF can be used to create the diagram plug-in which will act as the bridge between the graphical and domain models when user works with the editor. The generated diagram code can also be customized based on the requirements.

As discussed above, different algorithm editor 106 views can be created to facilitate the navigation and review of certain information. For example, as shown in FIG. 1, algorithm editor 106 can comprise one or more of at least the following views: policy parameter view 110, function view 112, and data view 114. In some embodiments, views can be created using SWT, UI and JFace Viewer. For example, views can be created using the following steps:

1. Create Plug-in
2. Add view extension in the plug-in xml.
3. Define the view class for the extension.

Algorithm editor 106 can also have one or more menus with items that include, for example, validate and run. In a manner similar to the view creation described above, a menu can be created using the following steps:

1. Create Plugin
2. Add menu action extension in the plugin xml.
3. Define the action class for the actions defined in step 2.

III. Example Class File Producer

Figure 3:
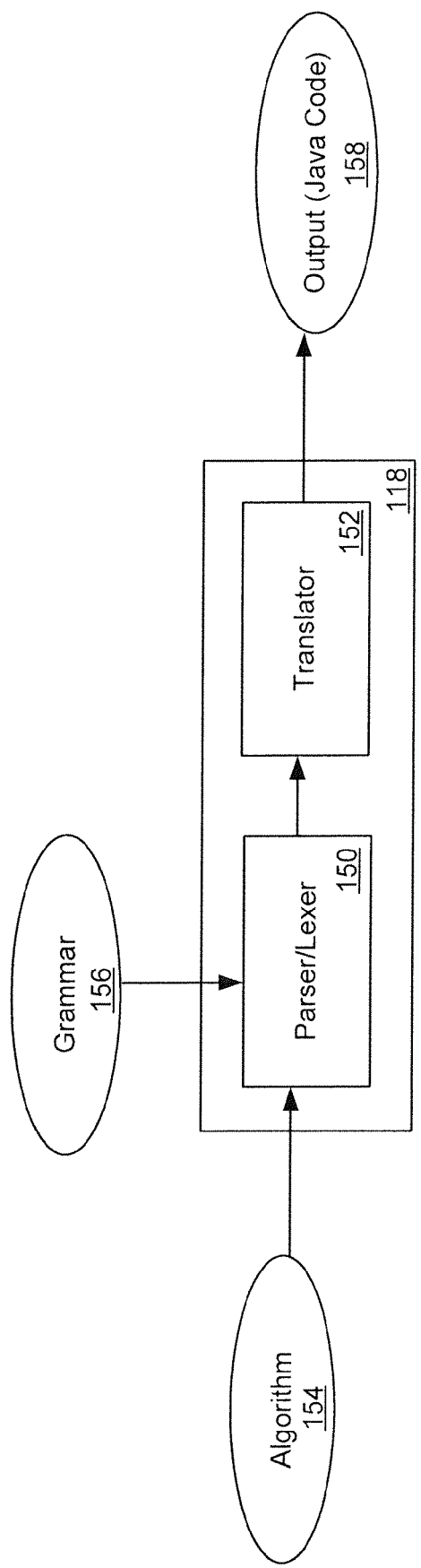
FIG. 3 illustrates an exemplary embodiment of class file producer configured to translate the business language of an algorithm editor output into relevant code.

FIG. 3 illustrates an exemplary embodiment of class file producer 116 configured to translate the business language of an algorithm editor output into relevant code. Class file producer 116 can comprise a parser 150 and a translator 152. As shown in FIG. 3, an algorithm 154 produced by algorithm editor 106 and grammar file 152 can be delivered to parser/lexer 150 and translator 152 to provide code 164 (e.g., Java code). In one embodiment, Java code can be created using a String Template Engine. String template engine can be easily extended to translate the business language into any technical language like Java, C++, etc.

By providing a user-friendly business language in the development of scenarios using the algorithm editor, the user can quickly develop or modify scenarios, which can reduce development time and effort, thereby providing for faster deployment of surveillance and monitoring systems.

In some embodiments, the business language can be defined in the form of ANTLR grammar and the grammar can be externalized in a plain text file which can be used to generate the ANTLR parser. Thus, the system can be easily customize and extend the business language to meet the business user's needs. Changes to the business language will not separately cause a significant impact to the development and use of the class file producer or other aspects of the system.

The grammar can be written in the text file having an extension ".g". ANTLRWorks can be used to facilitate writing the grammar, validating it and generating the parser out of it. The generated parser can comprise two classes, CTLexer and CTParser which extend the classes org.antlr.runtime.Lexer and org.antlr.runtime.Parser, respectively. The lexer can tokenize the input language and pass the token tree to the parser. The parser validates the token tree and returns the string templates corresponding to the input language. Though ANTLR has error handling mechanisms, a custom parser can be provided to customize error messages. For this, a custom parser can be written that extends the org.antlr.runtime.Parser. This custom parser overrides the method reportError( ) to log the error messages in a desired format. After ANTLRWorks generates the CTParser, it can be modified manually to extend it by CSParser, to provide a customized error handling mechanism.

Translator 152 can be implemented using a String Template engine library. String template can generate any type of text from the data structures. Input to the string template is the attribute map, which is translated into the desired text. When the string template is invoked, its toString ( ) method can be called which can perform the required translation. ANTLR string template library expects the translation code to be written in the text file having extension ".stg". But the stg file cannot contain the control logic. Also, it cannot remember the context in which the string template is invoked. To add these features, ANTLR string template can be extended by BaseStringTemplate class. BaseStringTemplate class can contain separate methods for each string template that is named the same as that of string template. For example, a program method can contain the translation logic for a string template named "program". When the "program" string template is called, a BaseStringTemplate can be instantiated with a stName="program". After this, a toString ( ) method can invoked which invokes the method "program" as the stName is set to "program". The text constructed by the string template method can then be returned to the client program which can write the text to the .java file. The Java file can then compiled and executed through batch script.

Similar to StringTemplate extensions, a StringTemplateGroup class can be extended by CSStringTemplateGroup, which can instantiate the BaseStringTemplate instead of StringTemplate class.

IV. Example Application Architecture

Figure 4:
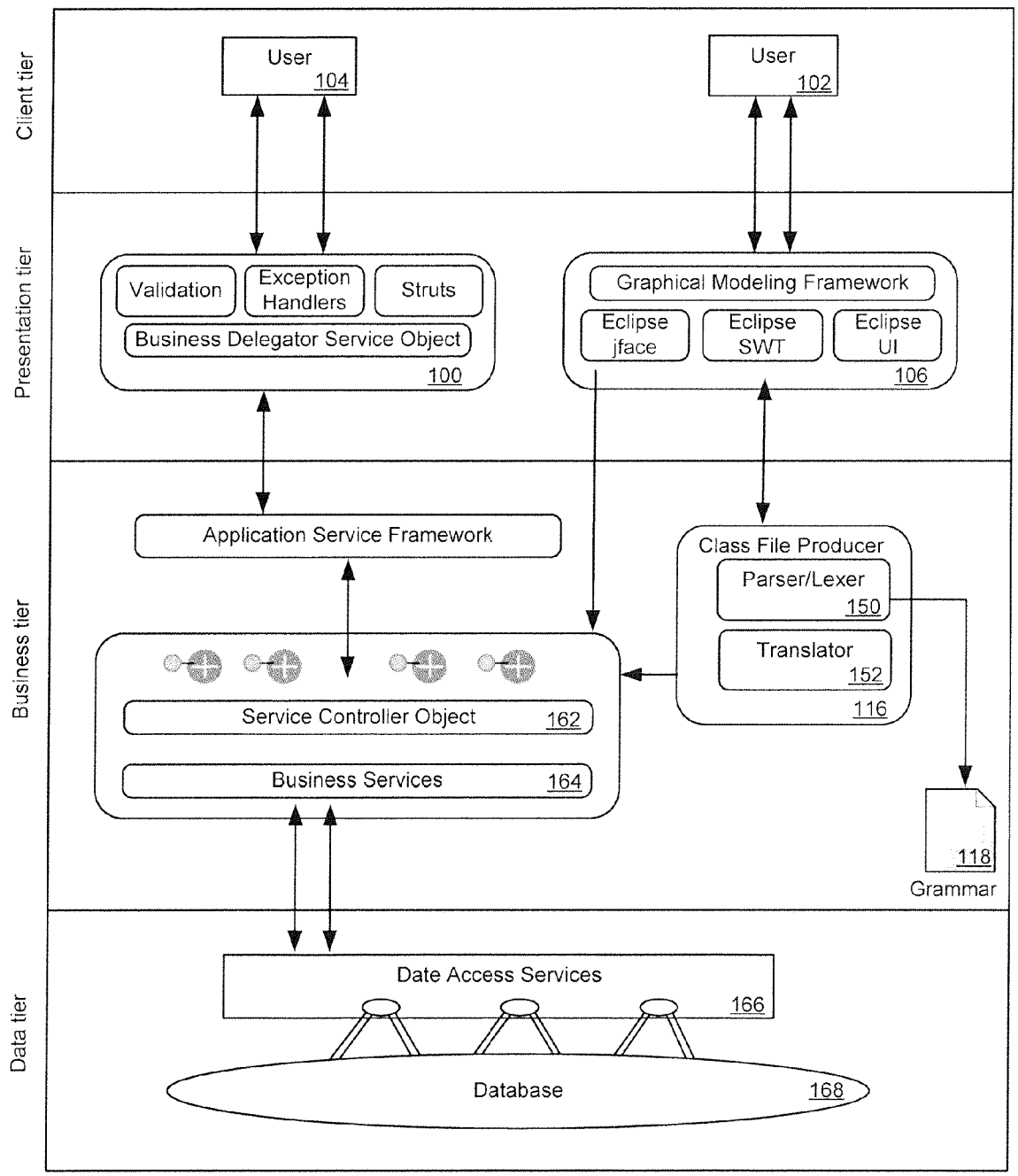
FIG. 4 illustrates an application architecture of an exemplary surveillance and compliance scenarios of a composition system.

FIG. 4 illustrates a high-level application architecture of an embodiment of the systems and methods described herein. As shown in FIG. 4, the system can comprise a client tier, a presentation tier, a business tier, and a data tier. As described above, first users 102 can comprise business and IT users (e.g. users that are generally techno functional). Second users 104 can comprise system administrators or other such members of a development team. First users 102 can review new scenarios developed in algorithm editor 106. In some embodiments, first users 102 can also have rights to manage scenario policies wherein first users 102 can set the values for policy parameters and data filters. Second users 104 (e.g., system administrators) can comprise functional development representatives who have domain knowledge as well as technical knowledge. Such second users can have rights to map the business data with information in a transaction database. As discussed in more detail above, second users 104 can create/edit policy parameters, data filters for new/existing scenarios, and scoring configurations.

At the client level users 102, 104 can interact with the system as described above. The presentation tier can comprise a struts and model-view controller design pattern 160. The struts framework is an implementation of the MVC (Model-View-Controller) pattern for web-based applications. Thus, in some embodiments, users 104 can access the system using a server environment comprising one or more computer servers and accessed from a client device via web browser. By using the struts in the presentation tier, development time can be decreased and productivity can be increased by providing foundation and plumbing blocks for the presentation tier. The use of struts also provides various features required for a typical web-based application, such as the handling of Http requests effectively, validations, tags for building HTML forms and presentation logic, exception handling etc.

At the business tier, for each module there can be one service interface 162. Service interface 162 can have business methods which are exposed to client code. A business service interface 164 can have an implementation class which calls corresponding business transaction object (BTO) classes. Actual business logic can be implemented in BTO class.

At the data tier, business entities can have their own data access object (DAO) interface (e.g., data access services 166) and its own implementation class. These classes can have methods which can be used by clients for making database connections with a database 168 to inserting/updating records and work on result sets. Each DAO class can carry out the database operation using, for example, IBatisDBServiceEngine. IBatisDBServiceEngine can be configured to extend the org.springframework.orm.ibatis.support.SqlMapClientDaoSupport and performs the database operations using, for example, iBatis.

Interface applications can be designed and developed using standard J2EE architecture with struts-based MVC architecture for presentation tier service, SPRING based business tier services, and, as noted above, IBATIS layer for database access. The three tier architecture enables the system to be readily scalable and reliable. In addition, the flexible loosely-coupled service-oriented architecture enables flexibility in replacing components as needed and/or desired.

In addition to the tiers described above, some infrastructure services can be shared across tiers. For example, configuration services, logging services, and caching services can be shared. With regard to configuration services, application configurable parameters can be stored in, for example, an ApplicationResource.properties file. With regard to logging services, logging into the application can be done at different levels of severity. The level of logging can be configured in an application configuration file that can be read at the application startup. Logging services can use log 4j logger component.

Caching services can be used by the system to reduce network traffic by caching static pages/images on the browser. Caching can be used in situations where it can be helpful to reduce the number of requests to database for reading rarely changing data and/or improve application performance (e.g., by reducing the database access time for fetching very frequently used static data). In some embodiments, web elements, such as static html, style sheets, JAVA scripts, and images are cached on the browser. In some embodiments, on the application server, only non-volatile reference data is cached. Caching performed by the system can be read-only to avoid cache synchronization issues. In some embodiments, distributed caching will not be performed and refreshing of cache (upon reference data change) is considered to be an administrative task.

For web applications, exception management can be achieved by logging and throwing the exception wherever they get generated, wrapping the exception in a base exception class and catch/handle the exceptions at an action layer, keeping user friendly messages in a resource bundle and picking appropriate message based on the context of the exception, and/or using the struts framework's action error to display an error on the screen. With regard to algorithm editor 106, exception messages can be directly shown on the console.

With regard to managing a user session, in some embodiments, the user session can be sticky (e.g., with each session mapped to a particular web server). This can reduce complexities that can result from session persistence and replication, and other events. The user session can be managed by a web container provided session management feature and an Http session interface. In some embodiments, the session is not used to hold large data objects; instead, lightweight proxies are provided to store the objects elsewhere.

Figure 5:
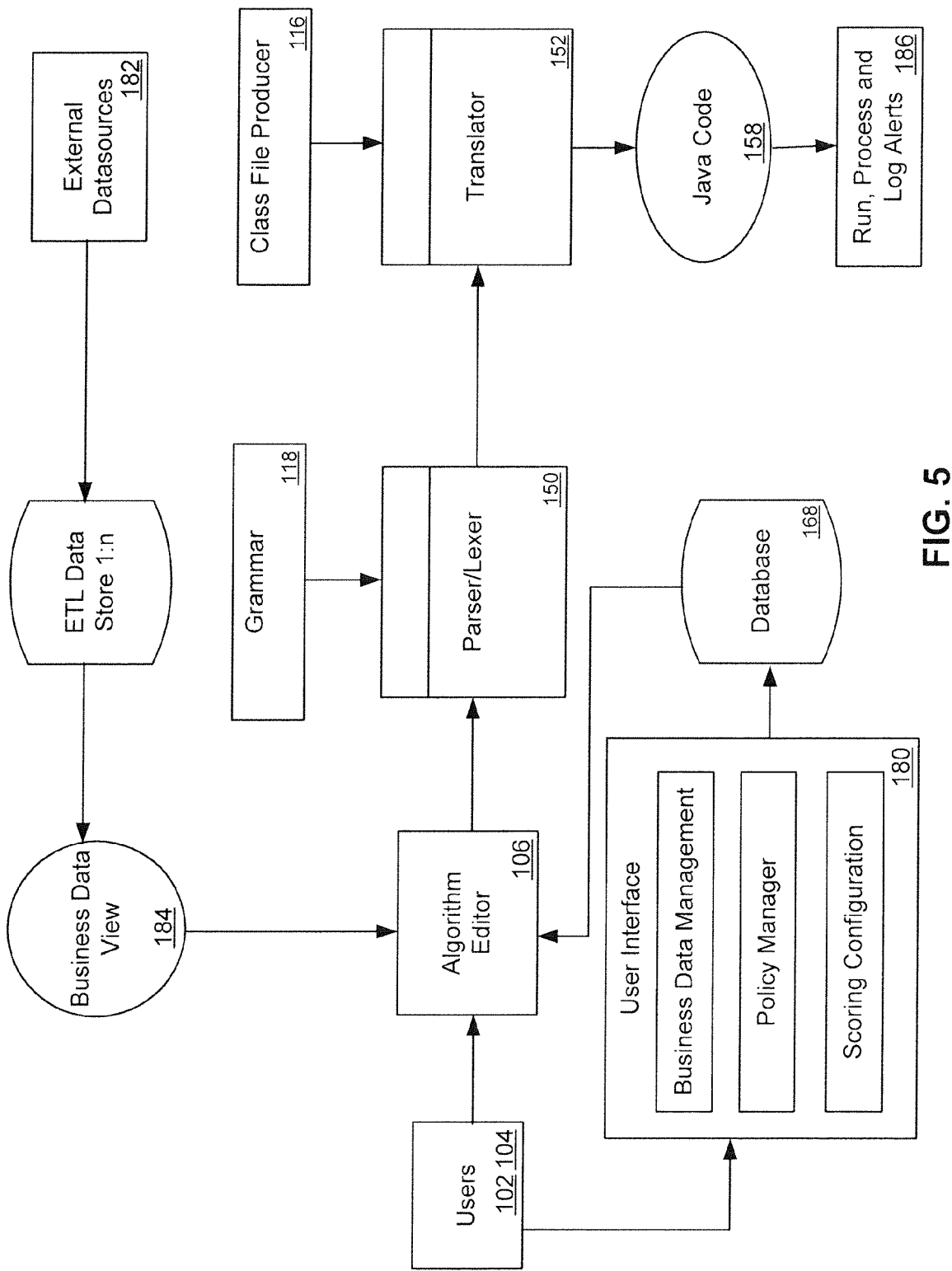
FIG. 5 illustrates diagram depicting a system for generating and/or maintaining surveillance and compliance scenarios.

FIG. 5 illustrates another schematic view illustrating a system for generating and/or maintaining surveillance and compliance scenarios. As show in FIG. 5 and as described in more detail herein, users 102, 104 can interact with the algorithm editor 106 to write detection logic in a business language, and with a user interface 180 to input parameters that define policies, scoring configurations, etc. External datasources 182 can be provided and can interact with a business data view 184, which provides a view of the underlying relational data model (e.g., external datasources 182) or logical data model in business friendly terminology. The flowchart created by the algorithm editor 106 can be validated and translated by parser/lexer 150 and translator 152. Class file producer 116 can interpret the flowchart (or representative information thereof) created by the algorithm editor 106 and the flowchart can be validated and translated into code (e.g., java code to perform the surveillance and compliance scenarios. As indicated at 186, the surveillance and compliance scenarios reflected in the java code can be run, processed, and alerts (indicative of potential fraud) can be logged.

V. Example Computing Device

The techniques and solutions described herein can be performed by software and/or hardware of a computing environment, such as a computing device. For example, computing devices include server computers, desktop computers, laptop computers, notebook computers, netbooks, tablet devices (such as those running on iOS, Windows, and/or Android operating systems), mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 6:
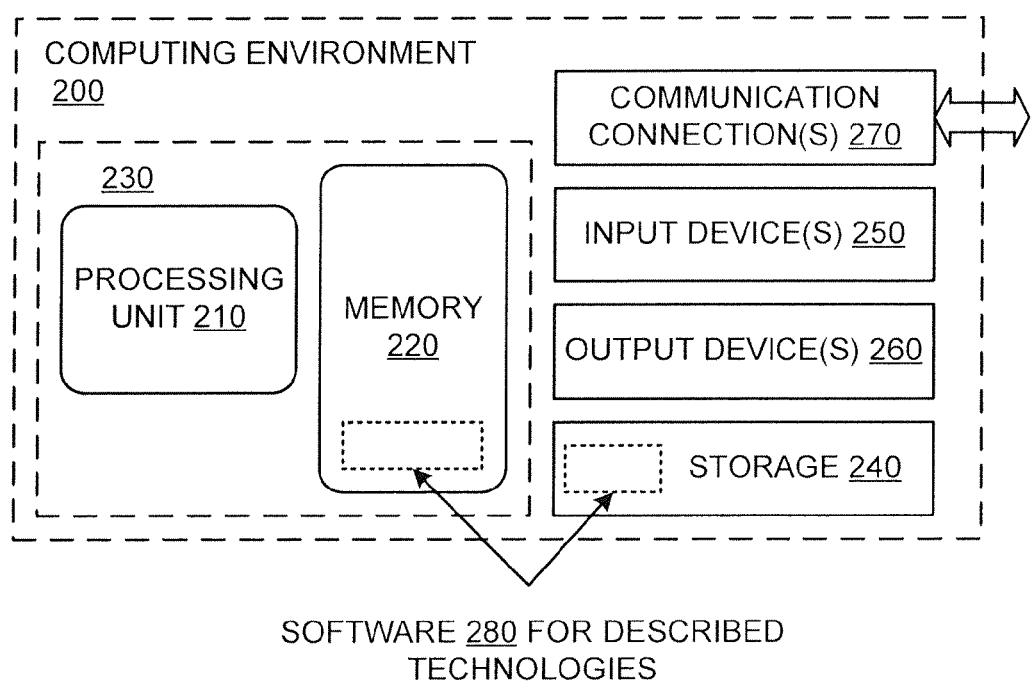
FIG. 6 is a block diagram showing an example computing device.

FIG. 6 illustrates a generalized example of a suitable computing environment 200 in which described embodiments, techniques, and technologies may be implemented. The computing environment 200 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, tablets (including those running on iOS, Windows, or Android operating systems), etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 200 includes at least one central processing unit 210 and memory 220. In FIG. 6, this most basic configuration 230 is included within a dashed line. The central processing unit 210 executes computer-executable instructions. In a multi-processing system, multiple processing units execute computer-executable instructions to increase processing power and as such, multiple processors can be running simultaneously. The memory 220 may be volatile memory (e.g., registers, cache, RAM), non-volatile memory (e.g., ROM, EEPROM, flash memory, etc.), or some combination of the two. The memory 220 stores software 280 that can, for example, implement the technologies described herein. A computing environment may have additional features. For example, the computing environment 200 includes storage 240, one or more input devices 250, one or more output devices 260, and one or more communication connections 270. An interconnection mechanism (not shown) such as a bus, a controller, or a network, interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, CD-RWs, DVDs, or any other tangible storage medium which can be used to store information and which can be accessed within the computing environment 200. The storage 240 stores instructions for the software 280, which can implement technologies described herein.

The input device(s) 250 may be a touch input device, such as a keyboard, keypad, mouse, pen, or trackball, a voice input device, a scanning device, or another device, that provides input to the computing environment 200. For audio, the input device(s) 250 may be a sound card or similar device that accepts audio input in analog or digital form, or a CD-ROM reader that provides audio samples to the computing environment 200. The output device(s) 260 may be a display, printer, speaker, CD-writer, or another device that provides output from the computing environment 200.

The communication connection(s) 270 enable communication over a communication medium (e.g., a connecting network) to another computing entity. The communication medium conveys information such as computer-executable instructions, compressed graphics information, or other data in a modulated data signal.

VI. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 220 and/or storage 240. As should be readily understood, the term computer-readable media does not include communication connections (e.g., 270) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more computers networked together.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

We claim:

1. A method, implemented at least in part by one or more computing devices, for generating surveillance and compliance scenarios, the method comprising:

receiving a plurality of surveillance and compliance scenarios created by a first user in a first language using a graphical modeling tool, the graphical modeling tool being configured to create one or more flowcharts of detection logic and the receiving of the plurality of surveillance and compliance scenarios comprises receiving the one or more flowcharts of detection logic or representations thereof;

translating the plurality of surveillance and compliance scenarios into a second language that is configured to perform the surveillance and compliance scenarios on the one or more computing devices to detect the occurrence of a potentially fraudulent event; and receiving a plurality of input parameters created by a second user relating to the plurality of surveillance and compliance scenarios, and receiving a plurality of filters that are configured to select a subset of transactions data on which the plurality of surveillance and compliance scenarios will be performed, the plurality of input parameters including a scoring configuration that provides a plurality of rules and weightages to be applied to a detected event to generate a risk or criticality score for the potentially fraudulent event, and receiving a plurality of threshold parameters that limit a number of alerts that can be generated by the plurality of surveillance and compliance scenarios when performed on the subset of transactions data.

2. The method of claim 1, wherein the first language comprises a business language and the second language comprises code for performing the surveillance and compliance scenarios on the one or more computing devices.

3. The method of claim 2, wherein the second language is Java, C++, or Python.

4. The method of claim 2, further comprising validating the accuracy of the plurality of surveillance and compliance scenarios.

5. A system for generating a plurality of surveillance and compliance scenarios, the system comprising:

one or more processors;

a first user interface comprising a graphical modeling tool for writing fraud detection logic in a first language, the first language comprising a business language and the first user interface comprising an algorithm editor that is configured to generate, by the one or more processors, one or more flowcharts in the business language, the flowcharts being representative of the fraud detection logic;

a second user interface for creating one or more configurable subsets of filters to be applied to the detection logic, and for receiving a plurality of input parameters created by a second user relating to the plurality of surveillance and compliance scenarios, the plurality of input parameters including a scoring configuration that provides a plurality of rules and weightages to be applied to a detected event to generate, by the one or more processors, a risk or criticality score for the potentially fraudulent event; and a class file producer configured to interpret the fraud detection logic in the first language and translate the fraud detection logic into a second language that is capable of performing the fraud detection on a subset of transactions data after application of the one or more configurable subsets of filters to the detection logic and generate one or more alerts, wherein the number of alerts that can be generated by the plurality of surveillance and compliance scenarios when performed on the subset of transactions data is limited by one or more threshold parameters.

6. The system of claim 5, wherein the first language comprises a business language and the second language is Java, C++, or Python.

7. The system of claim 6, wherein the first user interface comprises a plurality of views to facilitate creation of the fraud detection logic.

8. The system of claim 7, wherein the plurality of views comprise a business data view configured to reflect an underlying transaction data model in the business language.

9. The system of claim 7, wherein the plurality of views comprise a function view configured to display commonly-used functions for modifying fraud detection logic in the business language.

10. The system of claim 7, wherein the plurality of views comprise a policy parameter view to facilitate entry of values of policy parameters.

11. A computer-readable medium storing computer-executable instructions for causing a computing device to perform a method of generating surveillance and compliance scenarios, the method comprising:

receiving a plurality of surveillance and compliance scenarios created by a first user in a first language using a graphical modeling tool, the graphical modeling tool being configured to create one or more flowcharts of detection logic and the receiving of the plurality of surveillance and compliance scenarios comprises receiving the one or more flowcharts of detection logic or representations thereof;

translating the plurality of surveillance and compliance scenarios into a second language that is configured to perform the surveillance and compliance scenarios on the one or more computing devices to detect the occurrence of a potentially fraudulent event;

receiving a plurality of input parameters created by a second user relating to the plurality of surveillance and compliance scenarios, and receiving a plurality of filters that are configured to select a subset of transactions data on which the plurality of surveillance and compliance scenarios will be performed, the plurality of input parameters including a scoring configuration that provides a plurality of rules and weightages to be applied to a detected event to generate a risk or criticality score for the potentially fraudulent event, and receiving a plurality of threshold parameters that limit a number of alerts that can be generated by the plurality of surveillance and compliance scenarios when performed on the subset of transactions data.

12. The computer-readable medium of claim 11, wherein the receiving of the plurality of input parameters comprises:

receiving a plurality of filters that are configured to select a subset of transactions data on which the plurality of surveillance and compliance scenarios will be performed.

13. The computer-readable medium of claim 11, wherein the first language comprises a business language and the second language comprises code for performing the surveillance and compliance scenarios, the method further comprising validating the accuracy of the plurality of surveillance and compliance scenarios.

* * * * *